US012791727B1

(12) United States Patent
Banik et al.
(10) Patent No.: US 12,791,727 B1
(45) Date of Patent: Nov. 10, 2026

(54) LIDAR SENSOR SYSTEM INCLUDING PASSIVE CIRCUIT COMPONENTS

(71) Applicant: Aurora Operations, Inc., Mountain View, CA (US)

(72) Inventors: Swarnav Banik, San Jose, CA (US); Andrew Steil Michaels, Los Altos, CA (US); Phillip Sandborn, Sacramento, CA (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 516 days.

(21) Appl. No.: 18/511,546

(22) Filed: Nov. 16, 2023

(51) Int. Cl.
*G01S 17/931* (2020.01)
*G01S 7/481* (2006.01)
*G01S 7/4865* (2020.01)
*G02B 27/10* (2006.01)

(52) U.S. Cl.
CPC ........... *G01S 17/931* (2020.01); *G01S 7/4811* (2013.01); *G01S 7/4865* (2013.01); *G02B 27/1006* (2013.01)

(58) Field of Classification Search
CPC .... G01S 17/931; G01S 7/4811; G01S 7/4865; G02B 27/1006
See application file for complete search history.

(56) References Cited

U.S. PATENT DOCUMENTS 11,415,682 B1 * 8/2022 Clark .................... G01S 7/4861
11,668,805 B2 6/2023 Michaels et al.
2008/0007345 A1 * 1/2008 Cranford .................. H03L 7/02 331/16
2017/0310334 A1 * 10/2017 Chen ....................... H03M 1/14
2023/0337160 A1 * 10/2023 Khoury ............... H04W 56/005
2025/0096448 A1 * 3/2025 Zhang ..................... H01P 3/026

* cited by examiner

*Primary Examiner* — Isam A Alsomiri
*Assistant Examiner* — Joseph C Fritchman
(74) *Attorney, Agent, or Firm* — Dority & Manning, P.A.

(57) ABSTRACT

A Light Detection and Ranging (LIDAR) sensor system for a vehicle includes a light source configured to produce an optical signal; a splitter configured to receive the optical signal and produce a plurality of split optical signals; a complex signal generator configured to produce one or more current phase signals based on the plurality of split optical signals; one or more alternating current (AC)-coupled detectors configured to produce one or more voltage phase signals based on the one or more current phase signals, the one or more AC-coupled detectors configured to pass respective AC components of the one or more voltage phase signals; and a control circuit configured to: obtain the one or more voltage phase signals; determine respective direct current (DC) components of the one or more voltage phase signals; and determine a phase error on the optical signal based on the respective AC components and the respective DC components of the one or more voltage phase signals.

20 Claims, 8 Drawing Sheets

LIDAR SENSOR SYSTEM INCLUDING PASSIVE CIRCUIT COMPONENTS

BACKGROUND

Light Detection and Ranging (LIDAR) systems use lasers to create three-dimensional representations of surrounding environments. A LIDAR system includes at least one emitter paired with a receiver to form a channel, though an array of channels may be used to expand the field of view of the LIDAR system. During operation, each channel emits a laser beam into the environment. The laser beam reflects off of an object within the surrounding environment, and the reflected laser beam is detected by the receiver. A single channel provides a single point of ranging information. Collectively, channels are combined to create a point cloud that corresponds to a three-dimensional representation of the surrounding environment.

SUMMARY

Aspects and advantages of implementations of the present disclosure will be set forth in part in the following description, or may be learned from the description, or may be learned through practice of the implementations.

Example aspects of the present disclosure are directed to LIDAR systems. As further described herein, the LIDAR systems can be used by various devices and platforms (e.g., robotic platforms, etc.) to improve the ability of the devices and platforms to perceive their environment and perform functions in response thereto (e.g., autonomously navigating through the environment).

The present disclosure is directed to LIDAR systems for use with, for example, vehicles. A LIDAR system according to example aspects of the present disclosure includes a LIDAR module that includes an emitter configured to emit a light beam. The LIDAR module includes an optic device configured to split the light beam into a plurality of light beams. The LIDAR module includes an optical amplifier array configured to amplify the plurality of light beams to generate a plurality of amplified light beams. For instance, the optical power of the amplified light beams can, in some implementations, range from 10 decibels greater than an optical power of the plurality of light beams to 30 decibels greater than the optical power of the plurality of light beams. The LIDAR module includes a transceiver configured to facilitate transmitting the plurality of amplified light beams into a surrounding environment. The transceiver is further configured to receive return light beams from the surrounding environment that can be combined to generate point cloud data representative of objects in the surrounding environment.

A LIDAR sensor system's signal-to-noise ratio (SNR) can represent a strength, clarity, or accuracy of a given signal in the LIDAR system. Signals having a SNR lower than a SNR threshold may be considered unreliable. These unreliable signals may be discarded or compensated for by the LIDAR system. Furthermore, SNR can vary with distance from a target. The SNR may thus be used in defining a maximum detection range of a LIDAR system. For instance, the maximum detection range may be determined as a farthest distance at which the LIDAR system's SNR is higher than the SNR threshold. In some cases, a LIDAR system may be tested or calibrated in a test range before the LIDAR system is incorporated into a larger system, such as an autonomous vehicle. Optical phase error can contribute to reduced SNR of a LIDAR system.

However, age, wear, and other factors can cause the LIDAR system to degrade over time. For instance, individual components of the LIDAR system may degrade over time, which in turn can degrade the overall performance of the LIDAR system. For instance, integrated LIDAR systems including photonic integrated circuits (PIC), which package one or more photonic components on a single chip, can be susceptible to aging-related performance degradation. Degradation of these LIDAR systems can reduce operational characteristics of the LIDAR systems, such as by reducing detection accuracy, increasing the number of discarded detections, and/or reducing the maximum reliable detection range over time. It can therefore be beneficial to track changes in the optical phase error of LIDAR systems over time.

An optically-passive structure can be used to estimate optical phase error on alternating current (AC)-coupled detectors. The optically passive structure can estimate the phase error without requiring the use of components such as modulators. A LIDAR system can use a laser source or another light source to produce a beam that is used to generate a transmit signal. Due to modulation, back reflections, component degradation, and other effects of the LIDAR system, noise can be induced on the beam from the light source, producing a beam having a width over a frequency spectrum. It can generally be desirable to monitor the line width of the beam to assess the health of the light source, to determine interventions to improve the line width of the beam, to improve functioning of the LIDAR system (e.g., by compensating for the line width at downstream components of the LIDAR system) and so on.

This can be done using a coherent discriminator, where a noisy beam is split, one arm is delayed, then the split beams are provided to an optical hybrid. Outputs of the optical hybrid are provided to detectors (e.g., transimpedance amplifiers) to produce voltage signals corresponding to in-phase and quadrature components, which are used to estimate the phase of the noisy beam. Traditional coherent discriminators utilize direct current (DC)-coupled detectors to estimate line width or phase error. However, many DC-coupled detectors lack adequate properties for LIDAR applications, so LIDAR systems may utilize alternating current (AC)-coupled detectors instead.

Example aspects of the present disclosure provide for utilizing properties of the outputs of the optical hybrid signal to determine phase error on an input beam in a system including AC-coupled detectors. In one example approach, the DC differential between output voltage signals from the AC-coupled detectors are used to estimate a DC component of the output signals. In another example approach, the output signals of the optical hybrid are provided to an AC-coupled detector and a DC-coupled detector. The signal that is output by the AC-coupled detector experiences a high-pass response, while the signal that is output by the DC-coupled detector experiences a low-pass response. The DC-coupled detector's output represents the DC components of the output signals. The DC components of the output signals can be recombined with the output signals to determine the phase error or line width of the input beam. In yet another approach, one or both of the split beams is shifted by a phase modulator such that the DC component of the beam is within the high-pass AC-coupled detector's transfer function. In all of these approaches, the result is a set of output voltage signals having direct current (DC) and alternating current (AC) components which can be used to determine the phase error of the input beam.

For example, in an aspect, the present disclosure provides for a Light Detection and Ranging (LIDAR) sensor system for a vehicle. The LIDAR sensor system includes: a light source configured to produce an optical signal; a splitter configured to receive the optical signal and produce a plurality of split optical signals; a complex signal generator configured to produce one or more current phase signals based on the plurality of split optical signals; and one or more alternating current (AC)-coupled detectors configured to produce one or more voltage phase signals based on the one or more current phase signals, the one or more AC-coupled detectors configured to pass respective AC components of the one or more voltage phase signals. The LIDAR sensor system further includes a control circuit configured to: obtain the one or more voltage phase signals; determine respective direct current (DC) components of the one or more voltage phase signals; and determine a phase error on the optical signal based on the respective AC components and the respective DC components of the one or more voltage phase signals.

In some implementations, the plurality of split optical signals includes a first split optical signal and a second split optical signal, and a signal delay is introduced at the second split optical signal to delay the second split optical signal relative to the first split optical signal.

In some implementations, the signal delay is between about 0.1 meters and about 2 meters.

In some implementations, the first split optical signal is modulated by a phase modulator such that the one or more voltage phase signals are passed by the one or more AC-coupled detectors.

In some implementations, the complex signal generator includes: an optical hybrid configured to receive the plurality of split optical signals and produce a plurality of beat signals based on the plurality of split optical signals; and a plurality of balanced photodetectors configured to produce the one or more current phase signals based on the plurality of beat signals.

In some implementations, the one or more AC-coupled detectors include one or more transimpedance amplifiers (TIAs).

In some implementations, the one or more AC-coupled detectors include a capacitive coupling element.

In some implementations, the one or more AC-coupled detectors are configured to pass a frequency component of the one or more voltage phase signals having a frequency in at least a frequency range between about 50 Hz and about 1 kHz.

In some implementations, passing the frequency component of the one or more voltage phase signals includes attenuating the frequency component of the one or more voltage phase signals by less than about 50%.

In some implementations, the current phase signals include an in-phase current signal and a quadrature current signal.

In some implementations, the voltage phase signals include an in-phase voltage signal and a quadrature voltage signal.

In some implementations, determining the phase error on the optical signal includes determining a complex angle of the optical signal based on the one or more voltage phase signals; and the complex angle of the optical signal is representative of the phase error.

For example, in an aspect, the present disclosure provides for an autonomous vehicle (AV) control system for a vehicle. The AV control system includes a LIDAR sensor system. The LIDAR sensor system includes: a light source configured to produce an optical signal; a splitter configured to receive the optical signal and produce a plurality of split optical signals; a complex signal generator configured to produce one or more current phase signals based on the plurality of split optical signals; and one or more alternating current (AC)-coupled detectors configured to produce one or more voltage phase signals based on the one or more current phase signals, the one or more AC-coupled detectors configured to pass respective AC components of the one or more voltage phase signals. The LIDAR sensor system further includes a control circuit configured to: obtain the one or more voltage phase signals; determine respective direct current (DC) components of the one or more voltage phase signals; and determine a phase error on the optical signal based on the respective AC components and the respective DC components of the one or more voltage phase signals.

In some implementations, the plurality of split optical signals includes a first split optical signal and a second split optical signal, and a signal delay is introduced at the second split optical signal to delay the second split optical signal relative to the first split optical signal.

In some implementations, the first split optical signal is modulated by a phase modulator such that the one or more voltage phase signals are passed by the one or more AC-coupled detectors.

In some implementations, the complex signal generator includes: an optical hybrid configured to receive the plurality of split optical signals and produce a plurality of beat signals based on the plurality of split optical signals; and a plurality of balanced photodetectors configured to produce the one or more current phase signals based on the plurality of beat signals.

In some implementations, the one or more AC-coupled detectors are configured to pass a frequency component of the one or more voltage phase signals having a frequency in at least a frequency range between about 50 Hz and about 1 kHz, and passing the frequency component of the one or more voltage phase signals includes attenuating the frequency component of the one or more voltage phase signals by less than about 50%.

In some implementations, the current phase signals include an in-phase current signal and a quadrature current signal, and the voltage phase signals include an in-phase voltage signal and a quadrature voltage signal.

In some implementations, determining the phase error on the optical signal includes determining a complex angle of the optical signal based on the one or more voltage phase signals, and the complex angle of the optical signal is representative of the phase error.

For example, in an aspect, the present disclosure provides for an autonomous vehicle (AV). The AV includes a LIDAR sensor system. The LIDAR sensor system includes: a light source configured to produce an optical signal; a splitter configured to receive the optical signal and produce a plurality of split optical signals; a complex signal generator configured to produce one or more current phase signals based on the plurality of split optical signals; and one or more alternating current (AC)-coupled detectors configured to produce one or more voltage phase signals based on the one or more current phase signals, the one or more AC-coupled detectors configured to pass respective AC components of the one or more voltage phase signals. The LIDAR sensor system further includes a control circuit configured to: obtain the one or more voltage phase signals; determine respective direct current (DC) components of the one or more voltage phase signals; and determine a phase error on the optical signal based on the respective AC components and the respective DC components of the one or more voltage phase signals.

Other example aspects of the present disclosure are directed to other systems, methods, vehicles, apparatuses, tangible non-transitory computer-readable media, and devices for motion prediction and/or operation of a device including a LIDAR system having a LIDAR module according to example aspects of the present disclosure.

These and other features, aspects and advantages of various implementations of the present disclosure will become better understood with reference to the following description and appended claims. The accompanying drawings, which are incorporated in and constitute a part of this specification, illustrate implementations of the present disclosure and, together with the description, serve to explain the related principles.

DETAILED DESCRIPTION

The following describes the technology of this disclosure within the context of an autonomous vehicle for example purposes only. As described herein, the technology is not limited to an autonomous vehicle and can be implemented within other robotic and computing systems as well as various devices. For example, the systems and methods disclosed herein can be implemented in a variety of ways including, but not limited to, a computer-implemented method, an autonomous vehicle system, an autonomous vehicle control system, a robotic platform system, a general robotic device control system, a computing device, etc.

Figure 1:
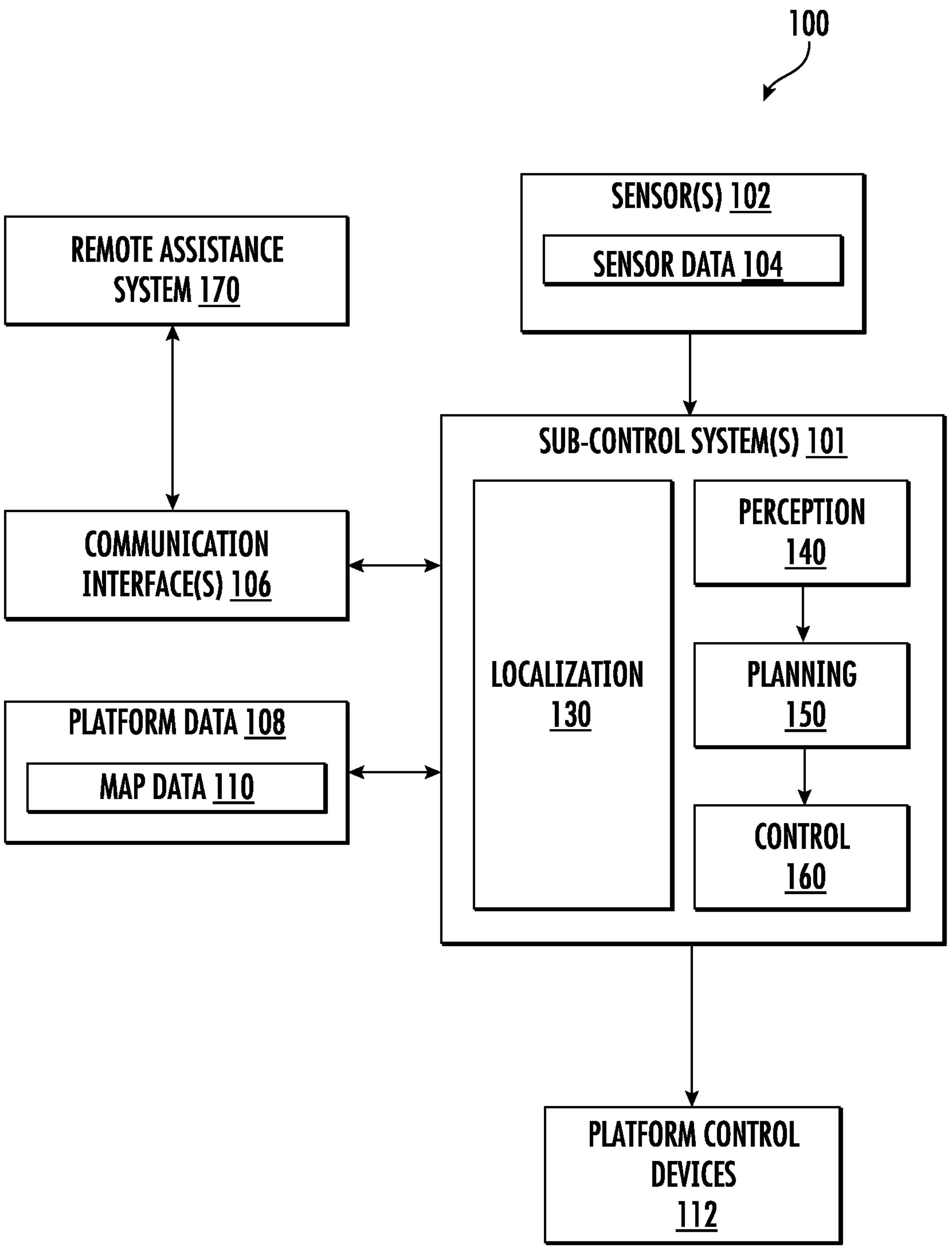
FIG. 1 depicts a block diagram of an example system according to some implementations of the present disclosure.

With reference to FIGS. 1-6, example implementations of the present disclosure are discussed in further detail. FIG. 1 depicts a block diagram of an example autonomous vehicle control system 100 for an autonomous vehicle according to some implementations of the present disclosure. The autonomous vehicle control system 100 can be implemented by a computing system of an autonomous vehicle). The autonomous vehicle control system 100 can include one or more sub-control systems 101 that operate to obtain inputs from sensor(s) 102 or other input devices of the autonomous vehicle control system 100. In some implementations, the sub-control system(s) 101 can additionally obtain platform data 108 (e.g., map data 110) from local or remote storage. The sub-control system(s) 101 can generate control outputs for controlling the autonomous vehicle (e.g., through platform control devices 112, etc.) based on sensor data 104, map data 110, or other data. The sub-control system 101 may include different subsystems for performing various autonomy operations. The subsystems may include a localization system 130, a perception system 140, a planning system 150, and a control system 160. The localization system 130 can determine the location of the autonomous vehicle within its environment; the perception system 140 can detect, classify, and track objects and actors in the environment; the planning system 150 can determine a trajectory for the autonomous vehicle; and the control system 160 can translate the trajectory into vehicle controls for controlling the autonomous vehicle. The sub-control system(s) 101 can be implemented by one or more onboard computing system(s). The subsystems can include one or more processors and one or more memory devices. The one or more memory devices can store instructions executable by the one or more processors to cause the one or more processors to perform operations or functions associated with the subsystems. The computing resources of the sub-control system(s) 101 can be shared among its subsystems, or a subsystem can have a set of dedicated computing resources.

In some implementations, the autonomous vehicle control system 100 can be implemented for or by an autonomous vehicle (e.g., a ground-based autonomous vehicle). The autonomous vehicle control system 100 can perform various processing techniques on inputs (e.g., the sensor data 104, the map data 110) to perceive and understand the vehicle's surrounding environment and generate an appropriate set of control outputs to implement a vehicle motion plan (e.g., including one or more trajectories) for traversing the vehicle's surrounding environment. In some implementations, an autonomous vehicle implementing the autonomous vehicle control system 100 can drive, navigate, operate, etc. with minimal or no interaction from a human operator (e.g., driver, pilot, etc.).

In some implementations, the autonomous vehicle can be configured to operate in a plurality of operating modes. For instance, the autonomous vehicle can be configured to operate in a fully autonomous (e.g., self-driving, etc.) operating mode in which the autonomous platform is controllable without user input (e.g., can drive and navigate with no input from a human operator present in the autonomous vehicle or remote from the autonomous vehicle, etc.). The autonomous vehicle can operate in a semi-autonomous operating mode in which the autonomous vehicle can operate with some input from a human operator present in the autonomous vehicle (or a human operator that is remote from the autonomous platform). In some implementations, the autonomous vehicle can enter into a manual operating mode in which the autonomous vehicle is fully controllable by a human operator (e.g., human driver, etc.) and can be prohibited or disabled (e.g., temporary, permanently, etc.) from performing autonomous navigation (e.g., autonomous driving, etc.). The autonomous vehicle can be configured to operate in other modes such as, for example, park or sleep modes (e.g., for use between tasks such as waiting to provide a trip/service, recharging, etc.). In some implementations, the autonomous vehicle can implement vehicle operating assistance technology (e.g., collision mitigation system, power assist steering, etc.), for example, to help assist the human operator of the autonomous platform (e.g., while in a manual mode, etc.).

The autonomous vehicle control system 100 can be located onboard (e.g., on or within) an autonomous vehicle and can be configured to operate the autonomous vehicle in various environments. The environment may be a real-world environment or a simulated environment. In some implementations, one or more simulation computing devices can simulate one or more of: the sensors 102, the sensor data 104, communication interface(s) 106, the platform data 108, or the platform control devices 112 for simulating operation of the autonomous vehicle control system 100.

In some implementations, the sub-control system(s) 101 can communicate with one or more networks or other systems with communication interface(s) 106. The communication interface(s) 106 can include any suitable components for interfacing with one or more network(s), including, for example, transmitters, receivers, ports, controllers, antennas, or other suitable components that can help facilitate communication. In some implementations, the communication interface(s) 106 can include a plurality of components (e.g., antennas, transmitters, or receivers, etc.) that allow it to implement and utilize various communication techniques (e.g., multiple-input, multiple-output (MIMO) technology, etc.).

In some implementations, the sub-control system(s) 101 can use the communication interface(s) 106 to communicate with one or more computing devices that are remote from the autonomous vehicle over one or more network(s). For instance, in some examples, one or more inputs, data, or functionalities of the sub-control system(s) 101 can be supplemented or substituted by a remote system communicating over the communication interface(s) 106. For instance, in some implementations, the map data 110 can be downloaded over a network to a remote system using the communication interface(s) 106. In some examples, one or more of the localization system 130, the perception system 140, the planning system 150, or the control system 160 can be updated, influenced, nudged, communicated with, etc. by a remote system for assistance, maintenance, situational response override, management, etc.

The sensor(s) 102 can be located onboard the autonomous platform. In some implementations, the sensor(s) 102 can include one or more types of sensor(s). For instance, one or more sensors can include image capturing device(s) (e.g., visible spectrum cameras, infrared cameras, etc.). Additionally or alternatively, the sensor(s) 102 can include one or more depth capturing device(s). For example, the sensor(s) 102 can include one or more LIDAR sensor(s) or Radio Detection and Ranging (RADAR) sensor(s). The sensor(s) 102 can be configured to generate point data descriptive of at least a portion of a three-hundred-and-sixty-degree view of the surrounding environment. The point data can be point cloud data (e.g., three-dimensional LIDAR point cloud data, RADAR point cloud data). In some implementations, one or more of the sensor(s) 102 for capturing depth information can be fixed to a rotational device in order to rotate the sensor(s) 102 about an axis. The sensor(s) 102 can be rotated about the axis while capturing data in interval sector packets descriptive of different portions of a three-hundred-and-sixty-degree view of a surrounding environment of the autonomous platform. In some implementations, one or more of the sensor(s) 102 for capturing depth information can be solid state.

The sensor(s) 102 can be configured to capture the sensor data 104 indicating or otherwise being associated with at least a portion of the environment of the autonomous vehicle. The sensor data 104 can include image data (e.g., 2D camera data, video data, etc.), RADAR data, LIDAR data (e.g., 3D point cloud data, etc.), audio data, or other types of data. In some implementations, the sub-control system(s) 101 can obtain input from additional types of sensors, such as inertial measurement units (IMUs), altimeters, inclinometers, odometry devices, location or positioning devices (e.g., GPS, compass), wheel encoders, or other types of sensors. In some implementations, the sub-control system(s) 101 can obtain sensor data 104 associated with one or more particular component(s) or system(s) of the autonomous vehicle. This sensor data 104 can indicate, for example, wheel speed, component temperatures, steering angle, cargo or passenger status, etc. In some implementations, the sub-control system(s) 101 can obtain sensor data 104 associated with ambient conditions, such as environmental or weather conditions. In some implementations, the sensor data 104 can include multi-modal sensor data. The multi-modal sensor data can be obtained by at least two different types of sensor(s) (e.g., of the sensors 102) and can indicate static and/or dynamic object(s) or actor(s) within an environment of the autonomous vehicle. The multi-modal sensor data can include at least two types of sensor data (e.g., camera and LIDAR data). In some implementations, the autonomous vehicle can utilize the sensor data 104 for sensors that are remote from (e.g., offboard) the autonomous vehicle. This can include for example, sensor data 104 captured by a different autonomous vehicle.

The sub-control system(s) 101 can obtain the map data 110 associated with an environment in which the autonomous vehicle was, is, or will be located. The map data 110 can provide information about an environment or a geographic area. For example, the map data 110 can provide information regarding the identity and location of different travel ways (e.g., roadways, etc.), travel way segments (e.g., road segments, etc.), buildings, or other items or objects (e.g., lampposts, crosswalks, curbs, etc.); the location and directions of boundaries or boundary markings (e.g., the location and direction of traffic lanes, parking lanes, turning lanes, bicycle lanes, other lanes, etc.); traffic control data (e.g., the location and instructions of signage, traffic lights, other traffic control devices, etc.); obstruction information (e.g., temporary or permanent blockages, etc.); event data (e.g., road closures/traffic rule alterations due to parades, concerts, sporting events, etc.); nominal vehicle path data (e.g., indicating an ideal vehicle path such as along the center of a certain lane, etc.); or any other map data that provides information that assists an autonomous vehicle in understanding its surrounding environment and its relationship thereto. In some implementations, the map data 110 can include high-definition map information. Additionally or alternatively, the map data 110 can include sparse map data (e.g., lane graphs, etc.). In some implementations, the sensor data 104 can be fused with or used to update the map data 110 in real time.

The sub-control system(s) 101 can include the localization system 130, which can provide an autonomous vehicle with an understanding of its location and orientation in an environment. In some examples, the localization system 130 can support one or more other subsystems of the sub-control system(s) 101, such as by providing a unified local reference frame for performing, e.g., perception operations, planning operations, or control operations.

In some implementations, the localization system 130 can determine the current position of the autonomous vehicle. A current position can include a global position (e.g., respecting a georeferenced anchor, etc.) or relative position (e.g., respecting objects in the environment, etc.). The localization system 130 can generally include or interface with any device or circuitry for analyzing a position or change in position of an autonomous vehicle. For example, the localization system 130 can determine position by using one or more of: inertial sensors (e.g., inertial measurement unit(s), etc.), a satellite positioning system, radio receivers, networking devices (e.g., based on IP address, etc.), triangulation or proximity to network access points or other network components (e.g., cellular towers, Wi-Fi access points, etc.), or other suitable techniques. The position of the autonomous vehicle can be used by various subsystems of the sub-control system(s) 101 or provided to a remote computing system (e.g., using the communication interface(s) 106).

In some implementations, the localization system 130 can register relative positions of elements of a surrounding environment of the autonomous vehicle with recorded positions in the map data 110. For instance, the localization system 130 can process the sensor data 104 (e.g., LIDAR data, RADAR data, camera data, etc.) for aligning or otherwise registering to a map of the surrounding environment (e.g., from the map data 110) to understand the autonomous vehicle's position within that environment. Accordingly, in some implementations, the autonomous vehicle can identify its position within the surrounding environment (e.g., across six axes, etc.) based on a search over the map data 110. In some implementations, given an initial location, the localization system 130 can update the autonomous vehicle's location with incremental re-alignment based on recorded or estimated deviations from the initial location. In some implementations, a position can be registered directly within the map data 110.

In some implementations, the map data 110 can include a large volume of data subdivided into geographic tiles, such that a desired region of a map stored in the map data 110 can be reconstructed from one or more tiles. For instance, a plurality of tiles selected from the map data 110 can be stitched together by the sub-control system 101 based on a position obtained by the localization system 130 (e.g., a number of tiles selected in the vicinity of the position).

In some implementations, the localization system 130 can determine positions (e.g., relative or absolute) of one or more attachments or accessories for an autonomous vehicle. For instance, an autonomous vehicle can be associated with a cargo platform, and the localization system 130 can provide positions of one or more points on the cargo platform. For example, a cargo platform can include a trailer or other device towed or otherwise attached to or manipulated by an autonomous vehicle, and the localization system 130 can provide for data describing the position (e.g., absolute, relative, etc.) of the autonomous vehicle as well as the cargo platform. Such information can be obtained by the other autonomy systems to help operate the autonomous vehicle.

The sub-control system(s) 101 can include the perception system 140, which can allow an autonomous platform to detect, classify, and track objects and actors in its environment. Environmental features or objects perceived within an environment can be those within the field of view of the sensor(s) 102 or predicted to be occluded from the sensor(s) 102. This can include object(s) not in motion or not predicted to move (static objects) or object(s) in motion or predicted to be in motion (dynamic objects/actors).

The perception system 140 can determine one or more states (e.g., current or past state(s), etc.) of one or more objects that are within a surrounding environment of an autonomous vehicle. For example, state(s) can describe (e.g., for a given time, time period, etc.) an estimate of an object's current or past location (also referred to as position); current or past speed/velocity; current or past acceleration; current or past heading; current or past orientation; size/footprint (e.g., as represented by a bounding shape, object highlighting, etc.); classification (e.g., pedestrian class vs. vehicle class vs. bicycle class, etc.); the uncertainties associated therewith; or other state information. In some implementations, the perception system 140 can determine the state(s) using one or more algorithms or machine-learned models configured to identify/classify objects based on inputs from the sensor(s) 102. The perception system can use different modalities of the sensor data 104 to generate a representation of the environment to be processed by the one or more algorithms or machine-learned models. In some implementations, state(s) for one or more identified or unidentified objects can be maintained and updated over time as the autonomous vehicle continues to perceive or interact with the objects (e.g., maneuver with or around, yield to, etc.). In this manner, the perception system 140 can provide an understanding about a current state of an environment (e.g., including the objects therein, etc.) informed by a record of prior states of the environment (e.g., including movement histories for the objects therein). Such information can be helpful as the autonomous vehicle plans its motion through the environment.

The sub-control system(s) 101 can include the planning system 150, which can be configured to determine how the autonomous platform is to interact with and move within its environment. The planning system 150 can determine one or more motion plans for an autonomous platform. A motion plan can include one or more trajectories (e.g., motion trajectories) that indicate a path for an autonomous vehicle to follow. A trajectory can be of a certain length or time range. The length or time range can be defined by the computational planning horizon of the planning system 150. A motion trajectory can be defined by one or more waypoints (with associated coordinates). The waypoint(s) can be future location(s) for the autonomous platform. The motion plans can be continuously generated, updated, and considered by the planning system 150.

The planning system 150 can determine a strategy for the autonomous platform. A strategy may be a set of discrete decisions (e.g., yield to actor, reverse yield to actor, merge, lane change) that the autonomous platform makes. The strategy may be selected from a plurality of potential strategies. The selected strategy may be a lowest cost strategy as determined by one or more cost functions. The cost functions may, for example, evaluate the probability of a collision with another actor or object.

The planning system 150 can determine a desired trajectory for executing a strategy. For instance, the planning system 150 can obtain one or more trajectories for executing one or more strategies. The planning system 150 can evaluate trajectories or strategies (e.g., with scores, costs, rewards, constraints, etc.) and rank them. For instance, the planning system 150 can use forecasting output(s) that indicate interactions (e.g., proximity, intersections, etc.) between trajectories for the autonomous platform and one or more objects to inform the evaluation of candidate trajectories or strategies for the autonomous platform. In some implementations, the planning system 150 can utilize static cost(s) to evaluate trajectories for the autonomous platform (e.g., "avoid lane boundaries," "minimize jerk," etc.). Additionally or alternatively, the planning system 150 can utilize dynamic cost(s) to evaluate the trajectories or strategies for the autonomous platform based on forecasted outcomes for the current operational scenario (e.g., forecasted trajectories or strategies leading to interactions between actors, forecasted trajectories or strategies leading to interactions between actors and the autonomous platform, etc.). The planning system 150 can rank trajectories based on one or more static costs, one or more dynamic costs, or a combination thereof. The planning system 150 can select a motion plan (and a corresponding trajectory) based on a ranking of a plurality of candidate trajectories. In some implementations, the planning system 150 can select a highest ranked candidate, or a highest ranked feasible candidate.

The planning system 150 can then validate the selected trajectory against one or more constraints before the trajectory is executed by the autonomous platform.

To help with its motion planning decisions, the planning system 150 can be configured to perform a forecasting function. The planning system 150 can forecast one or more future state(s) of the environment. This can include forecasting the future state(s) of other actors in the environment. In some implementations, the planning system 150 can forecast future state(s) based on current or past state(s) (e.g., as developed or maintained by the perception system 140). In some implementations, future state(s) can be or include forecasted trajectories (e.g., positions over time) of the objects in the environment, such as other actors. In some implementations, one or more of the future state(s) can include one or more probabilities associated therewith (e.g., marginal probabilities, conditional probabilities). For example, the one or more probabilities can include one or more probabilities conditioned on the strategy or trajectory options available to the autonomous vehicle. Additionally or alternatively, the probabilities can include probabilities conditioned on trajectory options available to one or more other actors.

To implement selected motion plan(s), the sub-control system(s) 101 can include a control system 160 (e.g., a vehicle control system). Generally, the control system 160 can provide an interface between the sub-control system(s) 101 and the platform control devices 112 for implementing the strategies and motion plan(s) generated by the planning system 150. For instance, the control system 160 can implement the selected motion plan/trajectory to control the autonomous platform's motion through its environment by following the selected trajectory (e.g., the waypoints included therein). The control system 160 can, for example, translate a motion plan into instructions for the appropriate platform control devices 112 (e.g., acceleration control, brake control, steering control, etc.). By way of example, the control system 160 can translate a selected motion plan into instructions to adjust a steering component (e.g., a steering angle) by a certain number of degrees, apply a certain magnitude of braking force, increase/decrease speed, etc. In some implementations, the control system 160 can communicate with the platform control devices 112 through communication channels including, for example, one or more data buses (e.g., controller area network (CAN), etc.), onboard diagnostics connectors (e.g., OBD-II, etc.), or a combination of wired or wireless communication links. The platform control devices 112 can send or obtain data, messages, signals, etc. to or from the sub-control system(s) 101 (or vice versa) through the communication channel(s).

The sub-control system(s) 101 can receive, through communication interface(s) 106, assistive signal(s) from remote assistance system 170. Remote assistance system 170 can communicate with the sub-control system(s) 101 over a network. In some implementations, the sub-control system(s) 101 can initiate a communication session with the remote assistance system 170. For example, the sub-control system(s) 101 can initiate a session based on or in response to a trigger. In some implementations, the trigger may be an alert, an error signal, a map feature, a request, a location, a traffic condition, a road condition, etc.

After initiating the session, the sub-control system(s) 101 can provide context data to the remote assistance system 170. The context data may include sensor data 104 and state data of the autonomous vehicle. For example, the context data may include a live camera feed from a camera of the autonomous vehicle and the autonomous vehicle's current speed. An operator (e.g., human operator) of the remote assistance system 170 can use the context data to select assistive signals. The assistive signal(s) can provide values or adjustments for various operational parameters or characteristics for the sub-control system(s) 101. For instance, the assistive signal(s) can include way points (e.g., a path around an obstacle, lane change, etc.), velocity or acceleration profiles (e.g., speed limits, etc.), relative motion instructions (e.g., convoy formation, etc.), operational characteristics (e.g., use of auxiliary systems, reduced energy processing modes, etc.), or other signals to assist the sub-control system(s) 101.

The sub-control system(s) 101 can use the assistive signal(s) for input into one or more autonomy subsystems for performing autonomy functions. For instance, the planning system 150 can receive the assistive signal(s) as an input for generating a motion plan. For example, assistive signal(s) can include constraints for generating a motion plan. Additionally or alternatively, assistive signal(s) can include cost or reward adjustments for influencing motion planning by the planning system 150. Additionally or alternatively, assistive signal(s) can be considered by the sub-control system(s) 101 as suggestive inputs for consideration in addition to other received data (e.g., sensor inputs, etc.).

The sub-control system(s) 101 may be platform agnostic, and the control system 160 can provide control instructions to platform control devices 112 for a variety of different platforms for autonomous movement (e.g., a plurality of different autonomous platforms fitted with autonomous control systems). This can include a variety of different types of autonomous vehicles (e.g., sedans, vans, SUVs, trucks, electric vehicles, combustion power vehicles, etc.) from a variety of different manufacturers/developers that operate in various different environments and, in some implementations, perform one or more vehicle services.

Figure 2:
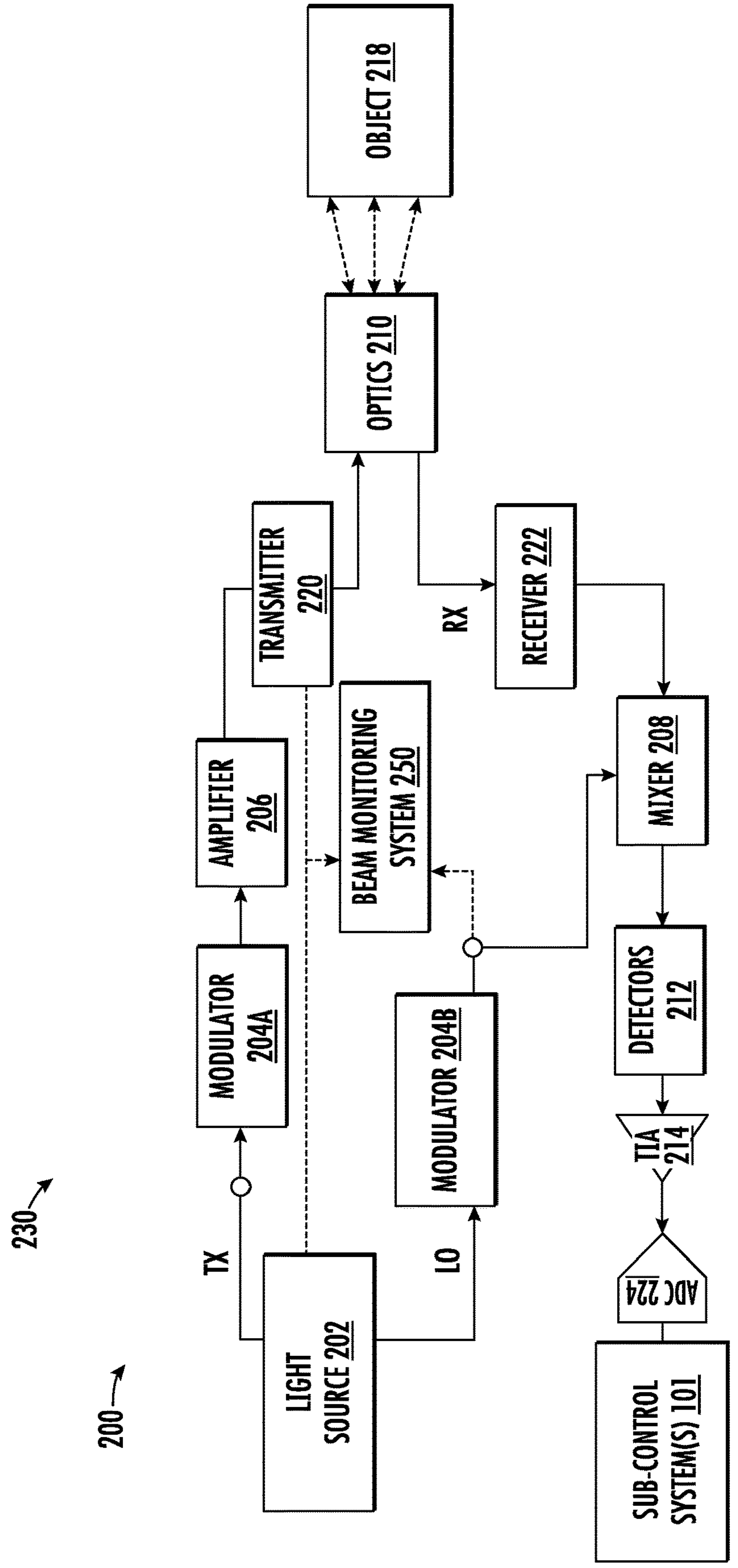
FIG. 2 depicts a block diagram of an example LIDAR system according to some implementations of the present disclosure.

FIG. 2 is a block diagram illustrating an example environment of a LIDAR sensor system for autonomous vehicles, according to some implementations. The environment includes a LIDAR system 200 that includes a transmit (Tx) path and a receive (Rx) path. The Tx path includes one or more Tx input/output ports, and the Rx path includes one or more Rx input/output ports. In some implementations, a semiconductor substrate and/or semiconductor package may include the Tx path and the Rx. In some implementations, the semiconductor substrate and/or semiconductor package may include at least one of silicon photonics circuitry, programmable logic controller (PLC), or III-V semiconductor circuitry.

The LIDAR system 200 includes one or more transmitters 220 and one or more receivers 222. The LIDAR system 200 further includes one or more optics 210 (e.g., an oscillatory scanner, a unidirectional scanner, a Risley prism, a circulator optic, and/or a beam collimator, etc.) that are coupled to the LIDAR system 200 (e.g., the transmitter 220 and/or receiver 222). In some implementations, the one or more optics 210 may be coupled to the Tx path via the one or more Tx input/output ports. In some implementations, the one or more optics 210 may be coupled to the Rx path via the one or more Rx input/output ports.

The LIDAR system 200 can be coupled to one or more sub-control system(s) 101 (e.g., the sub-control system(s)

101 of FIG. 1). In some implementations, the sub-control system(s) 101 may be coupled to the Rx path via the one or more Rx input/output ports. For instance, the sub-control system(s) 101 can receive LIDAR outputs from the LIDAR system 200. The sub-control system(s) 101 can control a vehicle (e.g., an autonomous vehicle) based on the LIDAR outputs.

The Tx path may include a light source 202, a modulator 204A, a modulator 204B, an amplifier 206, and one or more transmitters 220. The Rx path may include one or more receivers 222, a mixer 208, a detector 212, a transimpedance amplifier (TIA) 214, and one or more analog-to-digital converters (ADCs). Although FIG. 2 shows only a select number of components; the LIDAR system 200 may include any number of components and/or input/output channels (in any combination) that are interconnected in any arrangement to facilitate combining multiple functions of a LIDAR system, to support the operation of a vehicle.

The light source 202 may be configured to generate a light signal (or beam) that is derived from (or associated with) a local oscillator (LO) signal. In some implementations, the light source 202 can include a laser source configured to generate a laser beam. In some implementations, the light signal may have an operating wavelength that is equal to or substantially equal to 1550 nanometers. In some implementations, the light signal may have an operating wavelength that is between 1400 nanometers and 1440 nanometers.

The light source 202 may be configured to provide the light signal to the modulator 204A, which is configured to modulate a phase and/or a frequency of the light signal based on a first radio frequency (RF) signal (e.g., an "RF1" signal) to generate a modulated light signal, such as by Continuous Wave (CW) modulation or quasi-CW modulation. The modulator 204A may be configured to send the modulated light signal to the amplifier 206. The amplifier 206 may be configured to amplify the modulated light signal to generate an amplified light signal. The amplified light signal can be provided to the power distribution network 215. The power distribution network 215 can split the amplified light signal into a plurality of beams that are provided to the optics 210 via the one or more transmitters 220. The one or more transmitters 220 may include one or more optical waveguides or antennas. In some implementations, modulator 204A and/or modulator 204B may have a bandwidth between 400 megahertz (MHz) and 1000 (MHz).

The optics 210 may be configured to steer the amplified light signal(s) that it receives from the Tx path into an environment within a given field of view toward an object 218, may receive a returned signal reflected back from the object 218, and provide the returned signal to the mixer 208 of the Rx path via the one or more receivers 222. The one or more receivers 222 may include one or more optical waveguides or antennas. In some arrangements, the transmitters 220 and the receivers 222 may collectively constitute one or more transceivers. In some arrangements, the one or more transceivers may include a monostatic transceiver or a bistatic transceiver.

The light source 202 may be configured to provide the LO signal to the modulator 204B, which is configured to modulate a phase and/or a frequency of the LO signal based on a second RF signal (e.g., an "RF2" signal) to generate a modulated LO signal (e.g., using Continuous Wave (CW) modulation or quasi-CW modulation) and send the modulated LO signal to the mixer 208 of the Rx path. The mixer 208 may be configured to mix (e.g., combine, multiply, etc.) the modulated LO signal with the returned signal to generate a down-converted signal and send the down-converted signal to the detector 212.

According to example aspects of the present disclosure, the LIDAR system 200 can include a beam monitoring system 250. The beam monitoring system 250 can obtain at least a portion of an optical signal from the LIDAR system 200. For instance, in some implementations the beam monitoring system 250 can tap (e.g., using an optical tap) a percentage of the total power of a source signal to produce the optical signal. From the optical signal, the beam monitoring system 250 can determine an SNR degradation ratio associated with the LIDAR system 200. For instance, in some implementations such as the example LIDAR system 200 of FIG. 2, the beam monitoring system 250 may be configured to obtain a portion of the LO signal. The beam monitoring system 250 may obtain the LO signal from the light source 202, from the modulator 204B, or from any other suitable location. Although the beam monitoring system 250 is illustrated as obtaining the LO signal for the purposes of illustration, the beam monitoring system 250 can operate using any suitable optical signal. For instance, in some implementations, the beam monitoring system 250 may utilize at least a portion of a transmit signal (e.g., from modulator 204A, amplifier 206, transmitter 220) or any other suitable signal. In some cases, a suitable optical signal may not be a return signal (e.g., from receiver 222).

In some arrangements, the mixer 208 may be configured to send the modulated LO signal to the detector 212 (e.g., after the beam monitoring system 250 taps at least a portion of the LO signal or modulated LO signal). The detector 212 may be configured to generate an electrical signal based on the down-converted signal and send the electrical signal to the TIA 214. In some arrangements, the detector 212 may be configured to generate an electrical signal based on the down-converted signal and the modulated signal. The TIA 214 may be configured to amplify the electrical signal and send the amplified electrical signal to the sub-control system(s) 101 via the one or more ADCs 224. In some implementations, the TIA 214 may have a peak noise-equivalent power (NEP) that is less than 5 picowatts per square root Hertz (i.e., 5×10-12 Watts per square root Hertz). In some implementations, the TIA 214 may have a gain between 4 kiloohms and 25 kiloohms. In some implementations, detector 212 and/or TIA 214 may have a 3-decibel bandwidth between 80 kilohertz (kHz) and 450 megahertz (MHz).

The sub-control system(s) 101 may be configured to determine a distance to the object 218 and/or measure the velocity of the object 218 based on the one or more electrical signals that it receives from the TIA via the one or more ADCs 224.

Figure 3:
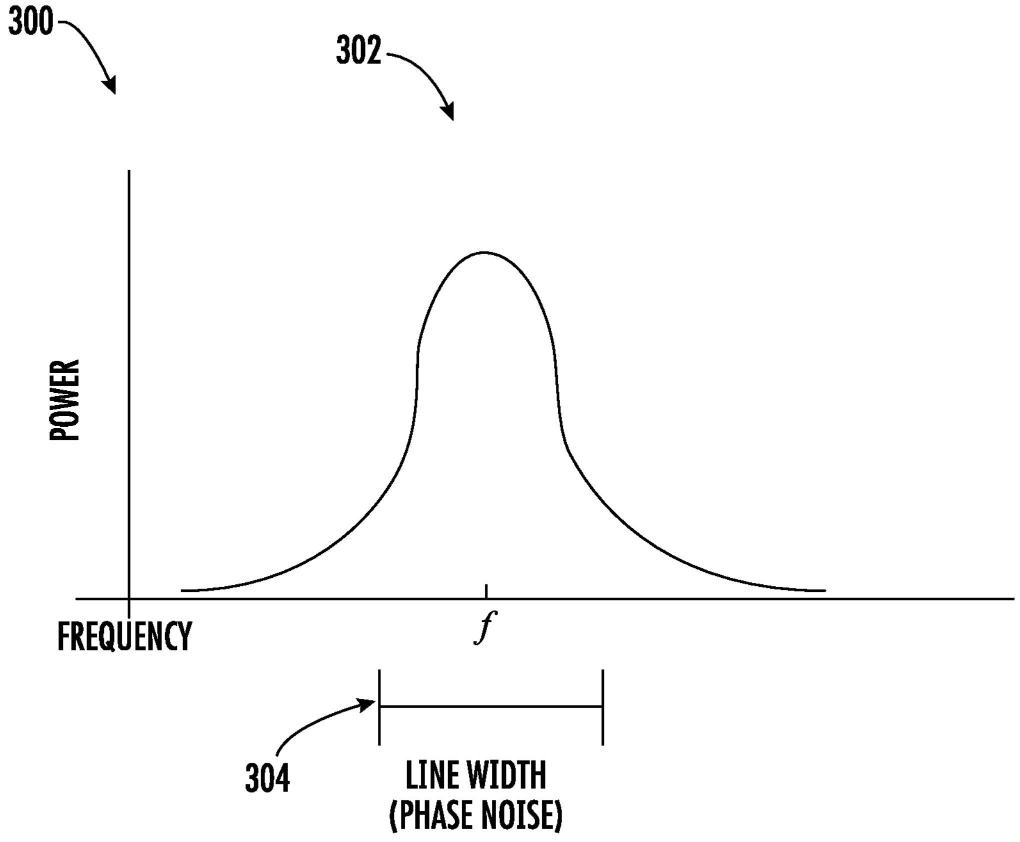
FIG. 3 depicts a plot illustrating power versus frequency of an optical signal according to some implementations of the present disclosure.

FIG. 3 depicts a plot 300 illustrating power versus frequency of an optical signal according to some implementations of the present disclosure. For instance, the optical signal may be a beam or transmit signal emitted by a light source and/or a LIDAR system (e.g., a transmitter). Additionally or alternatively, the optical signal may be a local oscillator (LO) signal. The power of the optical signal may be generally concentrated at a peak 302 corresponding to a particular frequency f. The frequency f may be, for example, an operating frequency of a LIDAR system. In some cases, the power of the optical signal may ideally resemble a spike curve, with the power concentrated entirely or nearly entirely at the frequency f. However, due to non-idealities in the light source, the power of the optical signal may in reality be distributed across a distribution including a band of frequencies. For instance, modulation in the system caused by phase modulators can induce noise on the frequency and phase of the modulated beam. The line width 304 can be a measure of how wide the power curve is. For instance, the line width 304 may be defined as a first frequency subtracted from a second frequency, where the first and second frequencies are frequencies at which the power of the optical signal inflects across a given power value, such as about 20% of the power at the peak 302 or another suitable power value. The measure of the line width 304 can be useful for determining health or other operational characteristics of a LIDAR system.

Figure 4A:
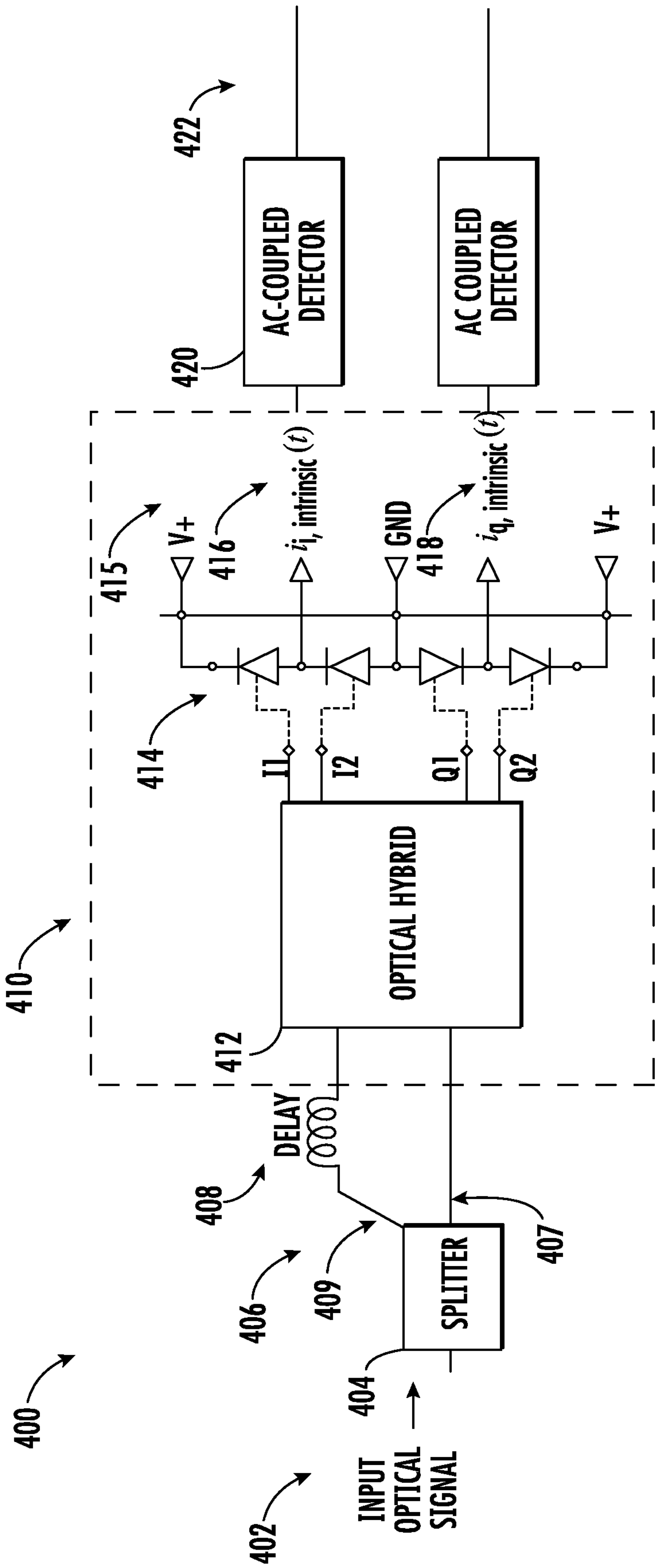
FIGS. 4A-4C depict diagrams of example beam monitoring systems according to some implementations of the present disclosure.

FIG. 4A depicts a diagram of an example beam monitoring system 400 according to some implementations of the present disclosure. The beam monitoring system 400 can obtain an optical signal 402, such as a beam. The optical signal 402 can be any suitable signal from a LIDAR sensor system (e.g., the LIDAR system 200 of FIG. 2). For instance, in some implementations, the optical signal 402 can be a local oscillator (LO) signal of the LIDAR sensor system. The LO signal can be produced by a light source. In some implementations, the LO signal may be modulated. Additionally or alternatively, the optical signal 402 can be a transmit signal of the LIDAR sensor system. The transmit signal can be a signal (e.g., a beam) that has been modulated and/or amplified for emission by the LIDAR sensor system.

The beam monitoring system 400 can include a splitter 404 (e.g., an optical splitter) configured to receive the optical signal 402. The splitter 404 can be configured to split the optical signal 402 into a plurality of split optical signals 406, which may be provided at separate outputs of the splitter 404. In some implementations, the plurality of split optical signals can include a first split optical signal 407 and a second split optical signal 409. A signal delay 408 can be introduced at the second split optical signal 409 to delay the second split optical signal 409 relative to the first split optical signal 407. The signal delay 408 can be induced by a length of waveguide or another suitable delay technique. In some implementations, the signal delay 408 can be between about 0.1 meters and 2 meters. For some example systems, this can translate to a delay of about 50 picoseconds to about 7 nanoseconds. For instance, the second split optical signal 409 can be delayed as if the second split optical signal 409 had traveled between about 0.1 m and 2 m greater distance than the first split optical signal 407 when the signals are received, or by about 50 picoseconds to about 7 nanoseconds, based on the optical transmission media of the beam monitoring system 400. This delay can be used in a transformation from the laser data output by an optical hybrid to laser frequency domain. Intuitively, this delay can be proportional to the "gain" of this measurement, whereby if the delay is too short, the measurement may be dominated by noise, and if it is too long it may not be feasible to manufacture. The use of a delay between about 0.1 m and about 2 m, or between about 50 picoseconds and about 7 nanoseconds, can provide a delay that is both feasible to manufacture and include in LIDAR systems while additionally being robust to electrical noise in the beam monitoring system 400.

In some implementations, the splitter 404 can be a two-way splitter, or 1×2 splitter. Two-way splitters may have a single input port and two output ports. An optical signal or beam received at the input port may be split evenly between the two output ports. Any suitable dimensionality of splitter 404, such as 2×2 splitters, 1×4 splitters, etc. may be employed in accordance with example aspects of the present disclosure.

The beam monitoring system 400 can include a complex signal generator 410. The complex signal generator 410 can be configured to produce one or more current phase signals 415 based on the plurality of split optical signals 406. As one example, the complex signal generator 410 can include an optical hybrid 412. The optical hybrid 412 can be configured to receive the plurality of split optical signals 406 and produce a plurality of output signals, referred to as "beat signals," based on the plurality of split optical signals 406. The optical hybrid 412 can be a system of optical dividers and combiners connected to mix a first signal (e.g., the first split optical signal 407) and a second signal (e.g., the second split optical signal 409), such that four vectorial additions of the first signal and the second signal are obtained. For instance, the four vectorial additions can represent the four quadratural states associated with the first signal. Because both input signals are formed of the same optical signal 402 that has been shifted by the signal delay 408 (which should be identical under ideal conditions when shifted by a coherent delay), any beat signals that arise from the combinations of the two input signals can be informative of nonidealities in the optical signal 402, such as the line width or phase error of the optical signal 402.

The beat signals from the optical hybrid 412 can be provided to balanced pairs of photodetectors to produce the current phase signals 415 corresponding to in-phase (I) and quadrature (Q) components of the second signal. In some implementations, the beam monitoring system can include a plurality of balanced photodetectors 414 (e.g., two balanced pairs of photodetectors) that are configured to produce the one or more current phase signals 415 based on the plurality of beat signals. The photodetectors 414 can be any suitable photodetectors, such as photodiodes.

The current phase signals 415 can include an in-phase current signal 416 and a quadrature current signal 418. The amplitude of the current phase signals 415 can respectively correspond to in-phase components and quadrature components of the phase error of the optical signal 402. For instance, an in-phase current signal 416 can correspond to an in-phase component of the phase error on the optical signal 402. Additionally or alternatively, the quadrature current signal 418 can correspond to a quadrature component of the phase error on the optical signal 402. In some implementations, for example, the intensity of the current phase signals 415 can be a sinusoidal response related to the inverse of the time difference between the inputs of the optical hybrid 412 (e.g., the signal delay 408). The sinusoidal responses of the current phase signals 415 can have a relative phase shift, such as a 90 degree phase shift. In some implementations, determining the phase error on the optical signal 402 can include determining a complex angle of the optical signal 402 that is representative of the phase error. For instance, the in-phase (I) and quadrature (Q) components of the phase error can define a complex equation $I+jQ$ representing the phase error in the complex domain. In particular, the complex angle formed by I and Q can inform the phase error on the optical signal 402. As one example, the line width of the optical signal 402 can be proportional to an amount by which the complex angle varies over time.

The phase error associated with a LIDAR sensor system can be utilized for diagnostic, calibration, and/or corrective uses at the LIDAR sensor system. For instance, a detection associated with the optical signal can be accepted or gated based on the phase error. Additionally or alternatively, the phase error can be used to diagnose anomalous behavior in components of the LIDAR systems. For instance, when the optical signal 402 is an internal signal of the LIDAR system such as an LO or Tx signal, the phase error can be intrinsic phase error. Intrinsic phase error can be attributable to aspects of the LIDAR system that are unrelated to interactions between an emitted transmit signal and free space, such as aspects of the LIDAR system that occur prior to and/or at the transmitter. For instance, the intrinsic phase error can result from intrinsic laser phase fluctuations, beam-scanning-induced dynamic speckle, and other intrinsic effects. The intrinsic phase error can be contrasted with extrinsic phase error, which results from interactions between emitted beams and objects in free space.

The beam monitoring system 400 can convert the current phase signals 415 to one or more voltage phase signals 422 using one or more AC-coupled detectors 420. The one or more AC-coupled detectors 420 can be configured to produce the voltage phase signals 422 based on the one or more current phase signals 415. For instance, the voltage phase signals 422 may be more readily usable by subsequent processing circuitry, such as, for example, sub-control system(s) 101 of FIG. 1, than current phase signals 415. For example, in some implementations, the current phase signals 415 may be converted to voltage phase signals 422 for processing in digital circuitry. The voltage phase signals 422 can include, for example, an in-phase voltage signal corresponding to the in-phase current signal 416 and a quadrature voltage signal corresponding to the quadrature current signal 418.

In some implementations, the AC-coupled detectors 420 can be or can include one or more transimpedance amplifiers (TIAs), such as one or more AC-coupled transimpedance amplifiers. The AC-coupled detectors 420 can include any suitable AC coupling, such as capacitive coupling. For instance, in some implementations, a capacitive coupling element, such as a capacitor or other suitable capacitive element, can be included in series with the AC-coupled detectors 420.

The AC-coupled detectors 420 can be configured to pass high-frequency components of the voltage phase signals 422. For instance, the current phase signals 415 or the voltage phase signals 422 can have frequency components (e.g., intensity at a given frequency) over several frequencies and/or frequency ranges. The AC-coupled detectors 420 can be high-pass such that frequency components having frequencies above a cutoff frequency are passed through the AC-coupled detectors 420 whereas frequency components having frequencies below the cutoff frequency are substantially attenuated. For instance, the AC-coupled detectors 420 can define a transfer function representing attenuation of signals passing through the AC-coupled detectors 420 with respect to frequency. As used herein, passing a signal or signal component through the AC-coupled detectors 420 can refer to attenuating the signal or signal component by less than about 50%, such as less than about 20%, of its original intensity (e.g., at a given frequency). The cutoff frequency can be any given frequency, such as about 50 Hz, or such as between about 50 Hz and 1 kHz, or such as greater than about 1 kHz Having the cutoff frequency between about 50 Hz and about 1 kHz can be especially beneficial for applications in LIDAR systems, as the AC-coupled detectors can attenuate especially high-frequency noise and near-DC noise while passing signals useful during normal detections.

The AC-coupled detectors 420 can be included in a LIDAR system due to desirable operational characteristics when used for object detection. For instance, the AC-coupled detectors 420 may not be band-limited to the same extent as many conventional DC-coupled detectors. Additionally or alternatively, many DC-coupled detectors can induce DC noise on detection signals that impact operation of LIDAR systems. Furthermore, some AC-coupled detectors can provide improved gain compared to DC-coupled detectors. Generally, analog electronics can be driven which DC power supplies, which may be noisy and expensive. Even in well-engineered systems, there is a risk of noise from power supplies leaking into transmitted electrical signals.

To solve these problems, LIDAR systems can include AC-coupled detectors for improved performance. For instance, the LIDAR system can include AC-coupled detectors on an Rx path (e.g., for detectors 212 of FIG. 2). In some cases, the AC-coupled detectors 420 of the beam monitoring system 400 can be selected to match those AC-coupled detectors at other points in the LIDAR system such as on the Rx path. Although the use of AC-coupled detectors 420 can provide improved performance, the high-pass characteristics of the AC-coupled detectors 420 can frustrate conventional approaches for determining phase error. For instance, the DC component of the I and Q components of the phase error may be eliminated by the AC-coupled detectors 420. The AC-coupled detectors can ignore DC components, including the near-DC noise from DC power supplies, while passing intended detection signals. Furthermore, AC-coupled detectors can be used in the detection electronics of the LIDAR system as well as the beam monitoring system 400 to reduce the number of distinct electronic components in a system and improve system design, assembly, and maintenance.

To solve this problem, a control circuit (e.g., of the beam monitoring system 400 or of the sub-control system(s) 101 of FIG. 1) can be configured to determine respective DC components of the voltage phase signals 422. For instance, the control circuit can reconstruct or estimate the DC components of the voltage phase signals 422 subsequent to passing through the AC-coupled detectors 420 and, consequently, being filtered by the AC coupling of the AC-coupled detectors. The control circuit can then determine a phase error on the optical signal 402 based on the respective AC components and the respective DC components of the one or more voltage phase signals 422.

Figure 4B:
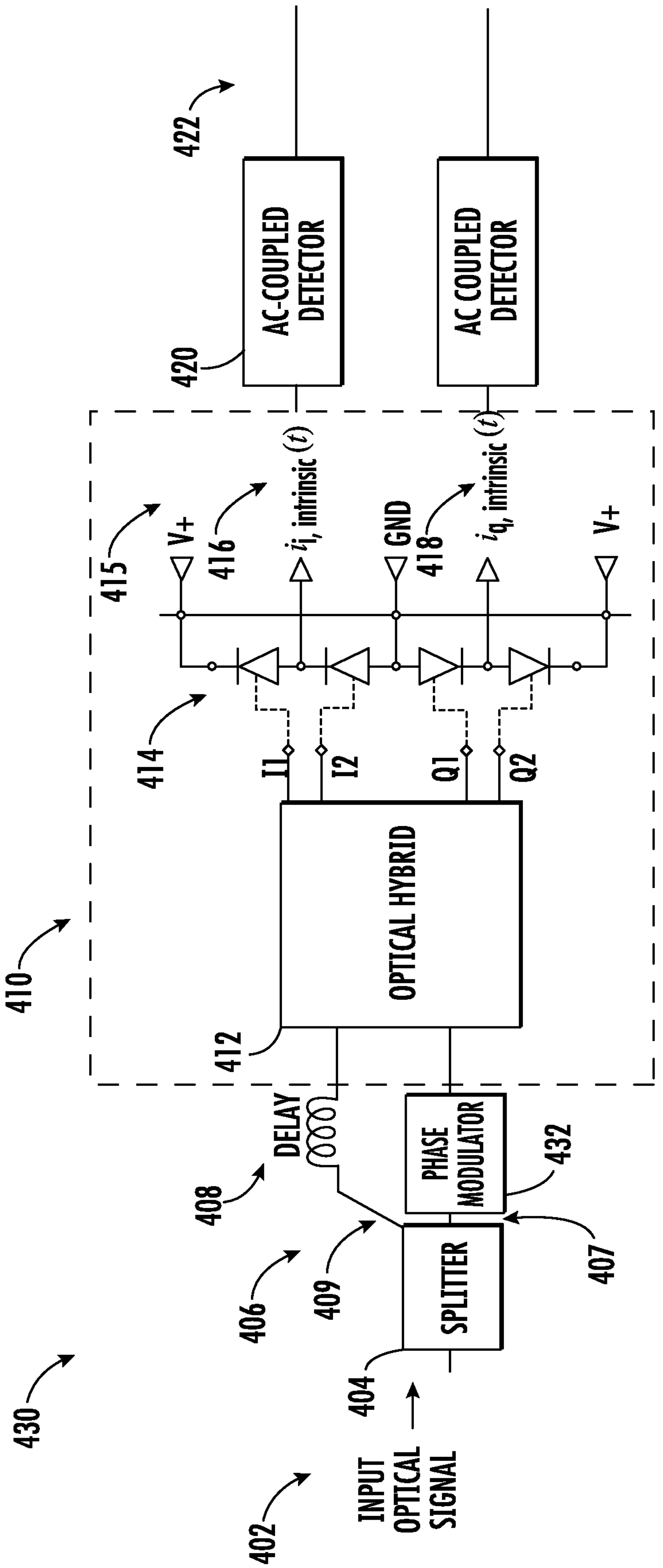

FIG. 4B depicts a beam monitoring system 430 according to some implementations of the present disclosure. The beam monitoring system 430 of FIG. 4B includes similar components to beam monitoring system 400 of FIG. 4A, which are denoted with like references numerals. In addition, the beam monitoring system 430 includes a phase modulator 432. The phase modulator 432 can be configured to modulate the first split optical signal 407 from the splitter 404 to induce a phase or frequency shift on the first split optical signal 407. In particular, according to example aspects of the present disclosure, the first split optical signal 407 can be modulated by the phase modulator 432 such that the voltage phase signals 422 are shifted to a frequency that is passed by the one or more AC-coupled detectors 420. For instance, in some implementations, the frequency differential between the first split optical signal 407 and the second split optical signal 409 can produce high-frequency beat signals at the optical hybrid 412 due to the frequency of the optical frequency shift induced by the phase modulator 432. The phase modulator 432 (which may be used for frequency shifting functionality) can be controlled to shift optical frequencies passing through the phase modulator 432 up or down by a fixed frequency, such as a fixed frequency between about 1 MHz to about 300 MHz. This can include frequencies of both the laser signal itself as well as the noise. When the first split optical signal 407, after passing through the phase modulator 432, is combined with the second split optical signal 409 at the optical hybrid 412, the frequency domain content of the measurement can be centered at the frequency of the shift. Compared to the example lacking the frequency shift, in which the frequency difference is zero between the signals 407 and 409, the frequency difference in this example is equal to the fixed frequency plus the noise on the laser signal. In this manner, the noise on the laser signal can be easily detected.

Figure 4C:
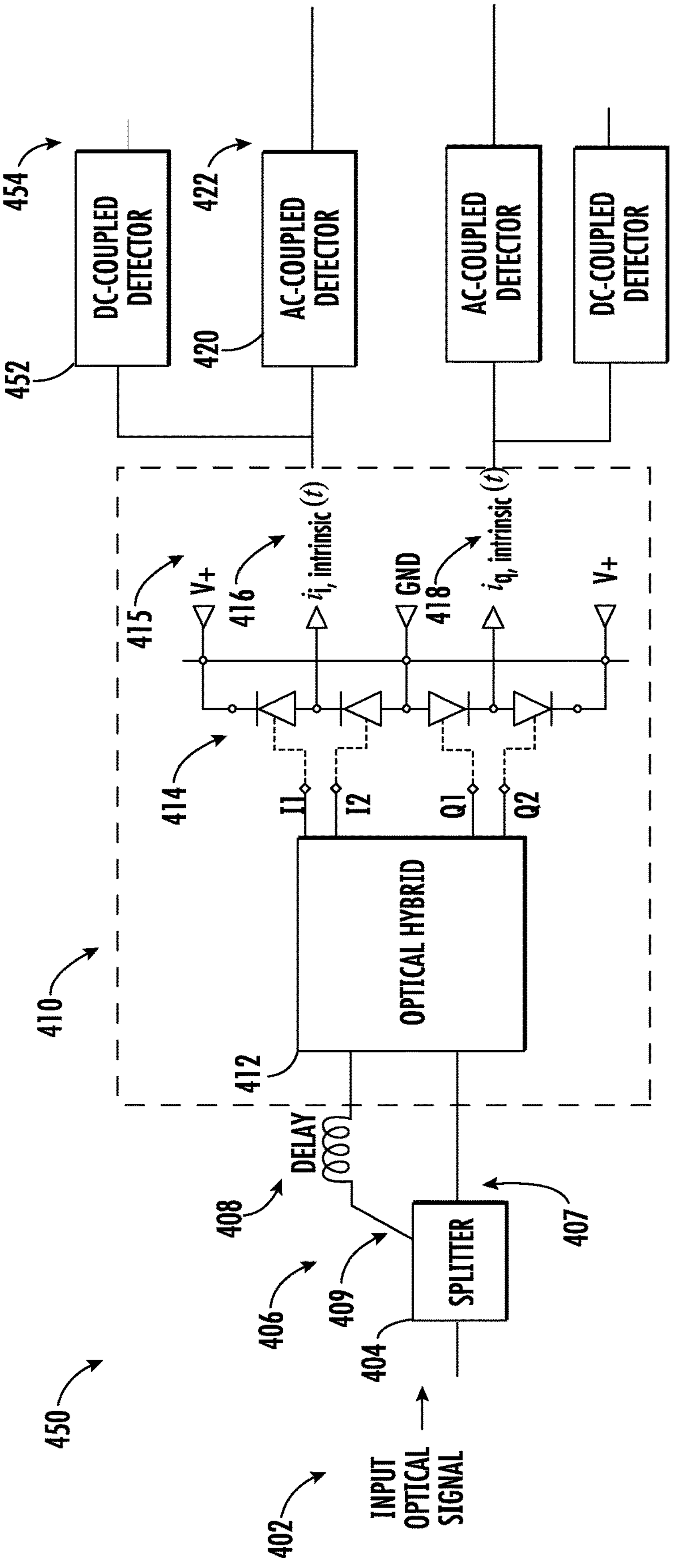

FIG. 4C depicts a beam monitoring system 450 according to some implementations of the present disclosure. The beam monitoring system 450 of FIG. 4C includes similar components to beam monitoring system 400 of FIG. 4A, which are denoted with like references numerals. In addition, the beam monitoring system 450 includes one or more DC-coupled detectors 452. The DC-coupled detectors 452 can have a complementary frequency output to the AC-coupled detectors 420. For instance, the DC-coupled detectors 452 can pass signals at a low frequency, such as frequencies between zero Hz and a cutoff frequency. In some implementations, the cutoff frequency of the DC-coupled detectors 452 can be the same as or within a threshold of the cutoff frequency of the AC-coupled detectors 420. In this manner, the DC-coupled detectors 452 can pass frequency components of the current phase signals 415 that are attenuated by the AC-coupled detectors 420 in its output signals 454. In particular, the output signals 454 can include especially the DC component of the current phase signals 415. However, because the DC-coupled detectors 452 are not used for detection purposes, the advantages of using the AC-coupled detectors 420 may still be achieved by the beam monitoring system 450. The information about the DC component from the output signals 454 can be combined with the higher frequency components from the voltage phase signals 422 to restore the DC component of the voltage phase signals 422.

Figure 5:
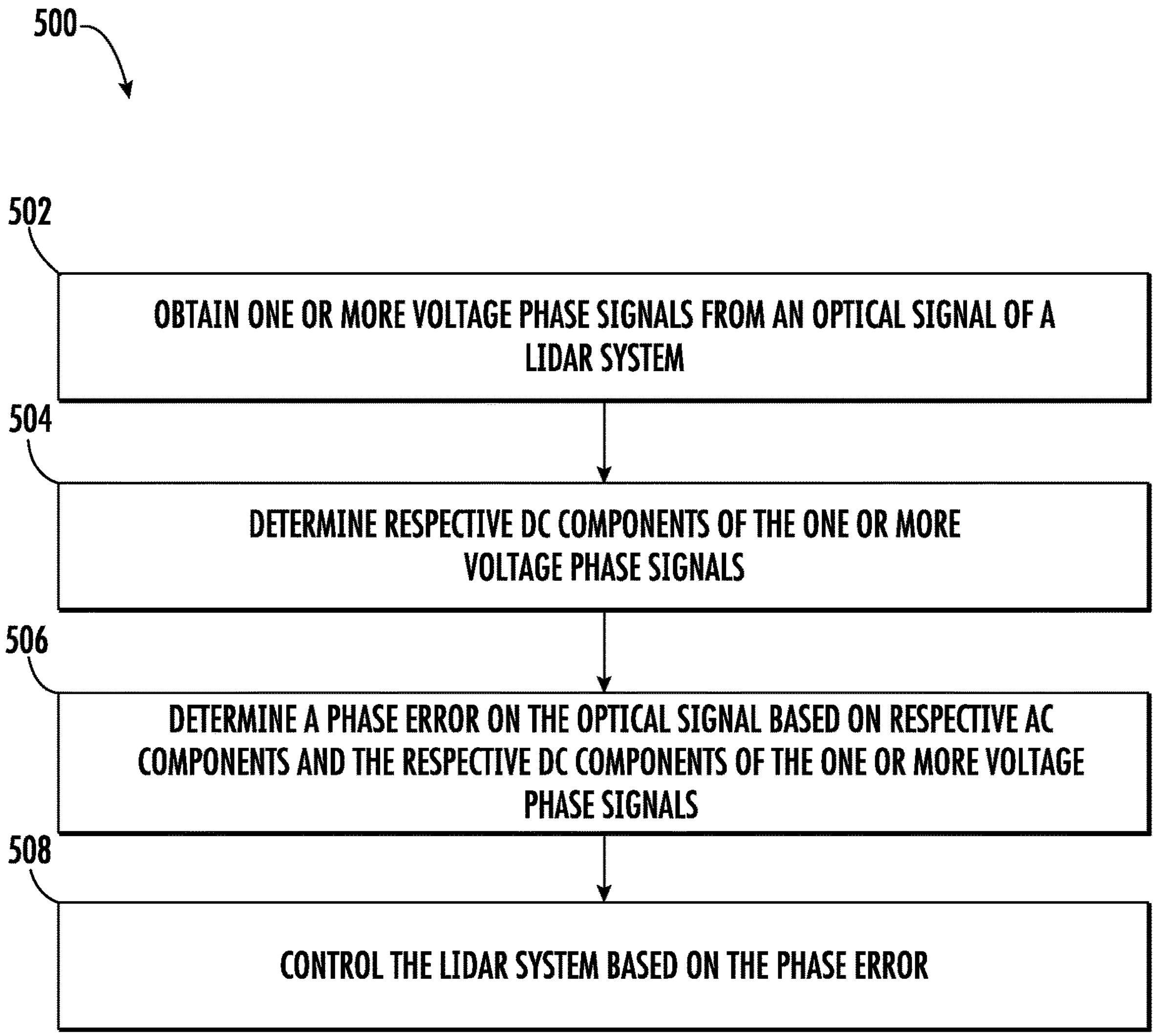
FIG. 5 depicts a flowchart diagram of an example method according to some implementations of the present disclosure.

FIG. 5 depicts a flowchart diagram of an example method 500 according to some implementations of the present disclosure. FIG. 5 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure.

At 502, the method 500 can include obtaining one or more voltage phase signals. The voltage phase signals can be obtained from an optical signal of a LIDAR system, such as, for example, a laser beam, a transmit signal, an LO signal, or another suitable signal. The voltage phase signals can be obtained by a coherent discriminator including AC-coupled detectors, as described with respect to, for example, FIGS. 4A through 4C. The AC-coupled detectors can filter out the DC components of the one or more voltage phase signals.

At 504, the method 500 can include determining respective DC components of the one or more voltage phase signals. The respective DC components of the voltage phase signals can be determined in any suitable manner as described herein. For instance, in some implementations, split optical signals used to generate the voltage phase signals can be shifted by a phase modulator such that the voltage phase signals maintain their respective DC components as they pass through an AC-coupled detector.

In some implementations, determining respective DC components of the one or more phase signals can include obtaining an output from a DC-coupled detector, the output indicative of the respective DC components. For instance, in some implementations, current phase signals can be provided to an AC-coupled detector to generate the voltage phase signals. In addition, the current phase signals can be provided to the DC-coupled detectors. The DC-coupled detectors can pass the DC components of the current phase signals as their outputs. In some implementations, the DC-coupled detectors may have complementary frequency responses to the AC-coupled detectors such that the outputs from the DC coupled detectors can be added to the voltage phase signals to determine complete voltage phase signals including both AC and DC components. For instance, the AC-coupled detectors and DC-coupled detectors may have a common cutoff frequency above which the frequency components of signals are passed and attenuated, respectively.

In some implementations, determining respective DC components of the one or more voltage phase signals can include correlating a variation in noise between an intensity of a first voltage phase signal and a second voltage phase signal. For instance, the first voltage phase signal can be an in-phase voltage signal and the second voltage phase signal can be a quadrature voltage signal. The output of the voltage phase signals with respect to optical frequency can be a sinusoidal response. The sinusoidal response can be correlated at a given frequency. For instance, the sinusoidal response of the first voltage phase signal and the second voltage phase signal can have a phase difference or phase shift (e.g., a 90 degree phase shift). At a given frequency and under ideal conditions, the intensity of the second voltage phase signal can be equal to that of the first voltage phase signal if shifted to align in phase with the second voltage phase signal. However, due to noise on the voltage phase signals, in reality the first voltage phase signal and the second voltage phase signals can have different intensities at any given frequency even if shifted such that the phase signals are aligned. The difference in intensity outputs can be used to estimate the DC components of the voltage phase signals using the knowledge that the noise is correlated on both phase signals and additional information from the voltage phase signals.

For instance, the transfer function of the I channel (for the in-phase voltage signal) and the Q channel (for the quadrature phase voltage signal) can be correlated in that each signal sinusoidal with respect to laser frequency. The Q channel transfer function can be shifted 90 degrees relative to the I channel. The center frequency of the laser and the delay characteristics of the imbalanced path can determine where the resulting I and Q signals manifest on their sinusoidal transfer function. The signals may be biased based on where the signals occur. For instance, a signal may be biased near a peak or trough of its transfer function such that small changes in frequency have a small effect on the measurement, or biased near a null such that small changes in frequency have a large effect on the measurement. Because both channels have the same change in laser frequency, analyzing the statistical nature of the amplitude change on both channels simultaneously and taking their ratio can provide insight to where on the transfer function curve the measurement occurs, based on the amount of bias in each channel. As an example, if the intensity of the in-phase voltage signal shifts by a large amount while the quadrature-phase voltage signal sifts by a small amount, the system can determine that the in-phase voltage signal is biased near its null and the quadrature-phase voltage signal is biased near its peak or trough.

At 506, the method 500 can include determining a phase error on the optical signal based on the respective AC components and the respective DC components of the one or more voltage phase signals. For instance, the respective AC components and the respective DC components can be recombined to generate complete voltage phase signals. The complete voltage phase signals can reflect both the DC and AC components of the current phase signals used to generate the voltage phase signals (e.g., by passing through the AC-coupled detectors). These complete voltage phase signals can be used to determine a complex angle that informs the phase error on the optical signal.

At 508, the method 500 can include controlling a LIDAR system based on the phase error. For instance, the phase error associated with a LIDAR sensor system can be utilized for diagnostic, calibration, and/or corrective uses at the LIDAR sensor system. For example, a detection associated with the optical signal can be accepted or gated based on the phase error. Additionally or alternatively, the phase error can be used to diagnose anomalous behavior in components of the LIDAR systems. For instance, when the optical signal is an internal signal of the LIDAR system such as an LO or Tx signal, the phase error can be intrinsic phase error. Intrinsic phase error can be attributable to aspects of the LIDAR system that are unrelated to interactions between an emitted transmit signal and free space, such as aspects of the LIDAR system that occur prior to and/or at the transmitter. For instance, the intrinsic phase error can result from intrinsic laser phase fluctuations, beam-scanning-induced dynamic speckle, and other intrinsic effects. The intrinsic phase error can be contrasted with extrinsic phase error, which results from interactions between emitted beams and objects in free space.

Figure 6:
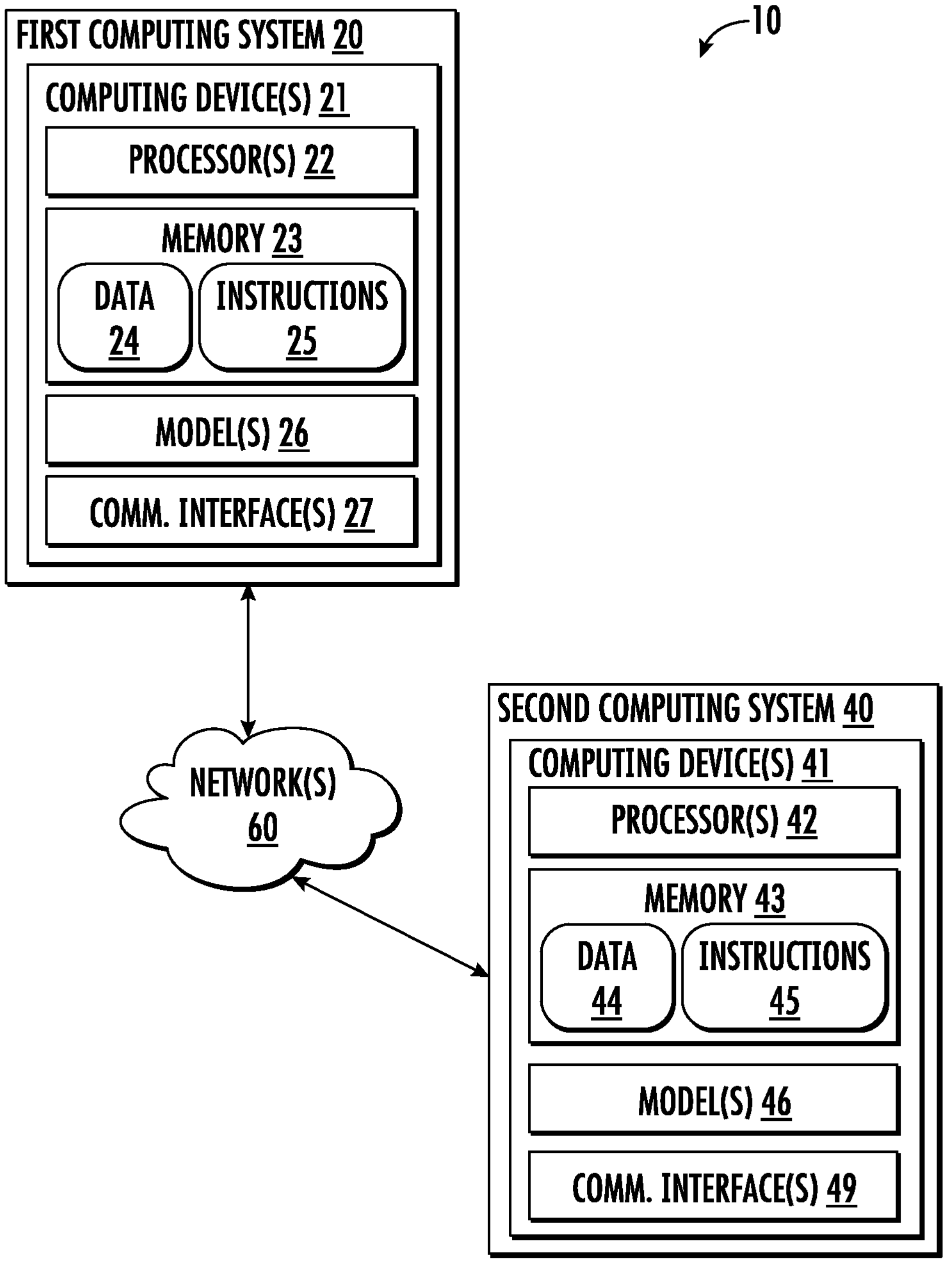
FIG. 6 depicts a diagram of an example computing system according to some implementations of the present disclosure.

FIG. 6 is a block diagram of an example computing ecosystem 10 according to example implementations of the present disclosure. The example computing ecosystem 10 can include a first computing system 20 and a second computing system 40 that are communicatively coupled over one or more networks 60. In some implementations, the first computing system 20 or the second computing system 40 can implement one or more of the systems, operations, or functionalities described herein.

In some implementations, the first computing system 20 can be included in an autonomous platform (e.g., an autonomous vehicle) and be utilized to perform the functions of an autonomous platform as described herein. For example, the first computing system 20 can be located onboard an autonomous vehicle and implement one or more autonomy system(s) for autonomously operating the autonomous vehicle. In some implementations, the first computing system 20 can represent the entire onboard computing system or a portion thereof. In other implementations, the first computing system 20 can not be located onboard an autonomous platform. The first computing system 20 can include one or more distinct physical computing devices 21.

The first computing system 20 (e.g., the computing device(s) 21 thereof) can include one or more processors 22 and a memory 23. The one or more processors 22 can be any suitable processing device (e.g., a processor core, a microprocessor, an ASIC, a FPGA, a controller, a microcontroller, etc.) and can be one processor or a plurality of processors that are operatively connected. The memory 23 can include one or more non-transitory computer-readable storage media, such as RAM, ROM, EEPROM, EPROM, one or more memory devices, flash memory devices, etc., and combinations thereof.

The memory 23 can store information that can be accessed by the one or more processors 22. For instance, the memory 23 (e.g., one or more non-transitory computer-readable storage media, memory devices, etc.) can store data 24 that can be obtained (e.g., received, accessed, written, manipulated, created, generated, stored, pulled, downloaded, etc.). The data 24 can include, for instance, sensor data, map data, data associated with autonomy functions (e.g., data associated with the perception, planning, or control functions), simulation data, or any data or information described herein. In some implementations, the first computing system 20 can obtain data from one or more memory device(s) that are remote from the first computing system 20.

The memory 23 can store computer-readable instructions 25 that can be executed by the one or more processors 22. The instructions 25 can be software written in any suitable programming language or can be implemented in hardware. Additionally, or alternatively, the instructions 25 can be executed in logically or virtually separate threads on the processor(s) 22.

For example, the memory 23 can store instructions 25 that are executable by one or more processors (e.g., by the one or more processors 22, by one or more other processors, etc.) to perform (e.g., with the computing device(s) 21, the first computing system 20, or other system(s) having processors executing the instructions) any of the operations, functions, or methods/processes (or portions thereof) described herein. For example, operations can include implementing system validation (e.g., as described herein).

In some implementations, the first computing system 20 can store or include one or more models 26. In some implementations, the models 26 can be or can otherwise include one or more machine-learned models (e.g., a machine-learned operational system, etc.). In some implementations, the first computing system 20 can obtain the one or more models 26 using communication interface(s) 27 to communicate with the second computing system 40 over the network(s) 60. For instance, the first computing system 20 can store the model(s) 26 (e.g., one or more machine-learned models) in the memory 23. The first computing system 20 can then use or otherwise implement the models 26 (e.g., by the processors 22). By way of example, the first computing system 20 can implement the model(s) 26 to localize an autonomous platform in an environment, perceive an autonomous platform's environment or objects therein, plan one or more future states of an autonomous platform for moving through an environment, control an autonomous platform for interacting with an environment, etc.

The second computing system 40 can include one or more computing devices 41. The second computing system 40 can include one or more processors 42 and a memory 43. The one or more processors 42 can be any suitable processing device (e.g., a processor core, a microprocessor, an ASIC, a FPGA, a controller, a microcontroller, etc.) and can be one processor or a plurality of processors that are operatively connected. The memory 43 can include one or more non-transitory computer-readable storage media, such as RAM, ROM, EEPROM, EPROM, one or more memory devices, flash memory devices, etc., and combinations thereof.

The memory 43 can store information that can be accessed by the one or more processors 42. For instance, the memory 43 (e.g., one or more non-transitory computer-readable storage media, memory devices, etc.) can store data 44 that can be obtained. The data 44 can include, for instance, testing data, log data, validation metrics, sensor data, model parameters, map data, simulation data, simulated environmental scenes, simulated sensor data, data associated with vehicle trips/services, or any data or information described herein. In some implementations, the second computing system 40 can obtain data from one or more memory device(s) that are remote from the second computing system 40.

The memory 43 can also store computer-readable instructions 45 that can be executed by the one or more processors 42. The instructions 45 can be software written in any suitable programming language or can be implemented in hardware. Additionally, or alternatively, the instructions 45 can be executed in logically or virtually separate threads on the processor(s) 42.

For example, the memory 43 can store instructions 45 that are executable (e.g., by the one or more processors 42, by the one or more processors 22, by one or more other processors, etc.) to perform (e.g., with the computing device(s) 41, the second computing system 40, or other system(s) having processors for executing the instructions, such as computing device(s) 21 or the first computing system 20) any of the operations, functions, or methods/processes described herein. This can include, for example, the functionality of the sub-control system 101 (e.g., localization, perception, planning, control, etc.) or other functionality associated with an autonomous platform (e.g., remote assistance, mapping, fleet management, trip/service assignment and matching, etc.). This can also include, for example, validating a machined-learned operational system.

In some implementations, the second computing system 40 can include one or more server computing devices. In the event that the second computing system 40 includes multiple server computing devices, such server computing devices can operate according to various computing architectures, including, for example, sequential computing architectures, parallel computing architectures, or some combination thereof.

Additionally, or alternatively to, the model(s) 26 at the first computing system 20, the second computing system 40 can include one or more models 46. The first computing system 20 and the second computing system 40 can each include communication interfaces 27 and 49, respectively. The communication interfaces 27, 49 can be used to communicate with each other or one or more other systems or devices, including systems or devices that are remotely located from the first computing system 20 or the second computing system 40. The communication interfaces 27, 49 can include any circuits, components, software, etc. for communicating with one or more networks (e.g., the network(s) 60). In some implementations, the communication interfaces 27, 49 can include, for example, one or more of a communications controller, receiver, transceiver, transmitter, port, conductors, software or hardware for communicating data.

The network(s) 60 can be any type of network or combination of networks that allows for communication between devices. In some implementations, the network(s) can include one or more of a local area network, wide area network, the Internet, secure network, cellular network, mesh network, peer-to-peer communication link or some combination thereof and can include any number of wired or wireless links. Communication over the network(s) 60 can be accomplished, for instance, through a network interface using any type of protocol, protection scheme, encoding, format, packaging, etc.

FIG. 6 illustrates one example computing ecosystem 10 that can be used to implement the present disclosure. Other systems can be used as well. For example, in some implementations, the first computing system 20 can include the model trainer(s) 47 and the training data 48. In such implementations, the model(s) 26, 46 can be both trained and used locally at the first computing system 20. As another example, in some implementations, the computing system 20 can not be connected to other computing systems. Additionally, components illustrated or discussed as being included in one of the computing systems 20 or 40 can instead be included in another one of the computing systems 20 or 40.

Computing tasks discussed herein as being performed at computing device(s) remote from the autonomous platform (e.g., autonomous vehicle) can instead be performed at the autonomous platform (e.g., via a vehicle computing system of the autonomous vehicle), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks or operations can be performed sequentially or in parallel. Data and instructions can be stored in a single memory device or across multiple memory devices.

Aspects of the disclosure have been described in terms of illustrative implementations thereof. Numerous other implementations, modifications, or variations within the scope and spirit of the appended claims can occur to persons of ordinary skill in the art from a review of this disclosure. Any and all features in the following claims can be combined or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Lists joined by a particular conjunction such as "or," for example, can refer to "at least one of" or "any combination of" example elements listed therein, with "or" being understood as "and/or" unless otherwise indicated. Also, terms such as "based on" should be understood as "based at least in part on."

Those of ordinary skill in the art, using the disclosures provided herein, will understand that the elements of any of the claims, operations, or processes discussed herein can be adapted, rearranged, expanded, omitted, combined, or modified in various ways without deviating from the scope of the present disclosure. Some of the claims are described with a letter reference to a claim element for exemplary illustrated purposes and is not meant to be limiting. The letter references do not imply a particular order of operations. For instance, letter identifiers such as (a), (b), (c), . . . , (i), (ii), (iii), . . . , etc. can be used to illustrate operations. Such identifiers are provided for the ease of the reader and do not denote a particular order of steps or operations. An operation illustrated by a list identifier of (a), (i), etc. can be performed before, after, or in parallel with another operation illustrated by a list identifier of (b), (ii), etc.

The following describes the technology of this disclosure within the context of a LIDAR system and an autonomous vehicle for example purposes only. As described herein, the technology described herein is not limited to an autonomous vehicle and can be implemented for or within other systems, autonomous platforms, and other computing systems.

What is claimed is:

1. A Light Detection and Ranging (LIDAR) sensor system for a vehicle, the LIDAR sensor system comprising:
a light source configured to produce an optical signal;
a splitter configured to receive the optical signal and produce a plurality of split optical signals;
a complex signal generator configured to produce one or more current phase signals based on the plurality of split optical signals;
one or more alternating current (AC)-coupled detectors configured to produce one or more voltage phase signals based on the one or more current phase signals, the one or more AC-coupled detectors configured to pass respective AC components of the one or more voltage phase signals; and
a control circuit configured to:
obtain the one or more voltage phase signals;
determine respective direct current (DC) components of the one or more voltage phase signals; and
determine a phase error on the optical signal based on the respective AC components and the respective DC components of the one or more voltage phase signals.

2. The LIDAR sensor system of claim 1, wherein the plurality of split optical signals comprises a first split optical signal and a second split optical signal, and wherein a signal delay is introduced at the second split optical signal to delay the second split optical signal relative to the first split optical signal.

3. The LIDAR sensor system of claim 2, wherein the signal delay is between about 0.1 meters and about 2 meters.

4. The LIDAR sensor system of claim 2, wherein the first split optical signal is modulated by a phase modulator such that the one or more voltage phase signals are passed by the one or more AC-coupled detectors.

5. The LIDAR sensor system of claim 1, wherein the complex signal generator comprises:
an optical hybrid configured to receive the plurality of split optical signals and produce a plurality of beat signals based on the plurality of split optical signals; and
a plurality of balanced photodetectors configured to produce the one or more current phase signals based on the plurality of beat signals.

6. The LIDAR sensor system of claim 1, wherein the one or more AC-coupled detectors comprise one or more transimpedance amplifiers (TIAs).

7. The LIDAR sensor system of claim 1, wherein the one or more AC-coupled detectors comprise a capacitive coupling element.

8. The LIDAR sensor system of claim 1, wherein the one or more AC-coupled detectors are configured to pass a frequency component of the one or more voltage phase signals having a frequency in at least a frequency range between about 50 Hz and about 1 kHz.

9. The LIDAR sensor system of claim 8, wherein passing the frequency component of the one or more voltage phase signals comprises attenuating the frequency component of the one or more voltage phase signals by less than about 50%.

10. The LIDAR sensor system of claim 1, wherein the current phase signals comprise an in-phase current signal and a quadrature current signal.

11. The LIDAR sensor system of claim 1, wherein the voltage phase signals comprise an in-phase voltage signal and a quadrature voltage signal.

12. The LIDAR sensor system of claim 1, wherein determining the phase error on the optical signal comprises determining a complex angle of the optical signal based on the one or more voltage phase signals; and wherein the complex angle of the optical signal is representative of the phase error.

13. An autonomous vehicle (AV) control system for a vehicle, the AV control system comprising:
a LIDAR sensor system, the LIDAR sensor system comprising:
a light source configured to produce an optical signal;
a splitter configured to receive the optical signal and produce a plurality of split optical signals;
a complex signal generator configured to produce one or more current phase signals based on the plurality of split optical signals; and
one or more AC-coupled detectors configured to produce one or more voltage phase signals based on the one or more current phase signals, the one or more AC-coupled detectors configured to pass respective AC components of the one or more voltage phase signals; and
a control circuit configured to:
obtain the one or more voltage phase signals;
determine respective DC components of the one or more voltage phase signals; and
determine a phase error on the optical signal based on the respective AC components and the respective DC components of the one or more voltage phase signals.

14. The AV control system of claim 13, wherein the plurality of split optical signals comprises a first split optical signal and a second split optical signal, and wherein a signal delay is introduced at the second split optical signal to delay the second split optical signal relative to the first split optical signal.

15. The AV control system of claim 14, wherein the first split optical signal is modulated by a phase modulator such that the one or more voltage phase signals are passed by the one or more AC-coupled detectors.

16. The AV control system of claim 13, wherein the complex signal generator comprises:
an optical hybrid configured to receive the plurality of split optical signals and produce a plurality of beat signals based on the plurality of split optical signals; and
a plurality of balanced photodetectors configured to produce the one or more current phase signals based on the plurality of beat signals.

17. The AV control system of claim 13, wherein the one or more AC-coupled detectors are configured to pass a frequency component of the one or more voltage phase signals having a frequency in at least a frequency range between about 50 Hz and about 1 kHz, wherein passing the frequency component of the one or more voltage phase signals comprises attenuating the frequency component of the one or more voltage phase signals by less than about 50%.

18. The AV control system of claim 13, wherein the current phase signals comprise an in-phase current signal and a quadrature current signal, and wherein the voltage phase signals comprise an in-phase voltage signal and a quadrature voltage signal.

19. The AV control system of claim 13, wherein determining the phase error on the optical signal comprises determining a complex angle of the optical signal based on the one or more voltage phase signals; and wherein the complex angle of the optical signal is representative of the phase error.

20. An autonomous vehicle comprising:

a LIDAR sensor system comprising:

a light source configured to produce an optical signal;

a splitter configured to receive the optical signal and produce a plurality of split optical signals;

a complex signal generator configured to produce one or more current phase signals based on the plurality of split optical signals; and one or more AC-coupled detectors configured to produce one or more voltage phase signals based on the one or more current phase signals, the one or more AC-coupled detectors configured to pass respective AC components of the one or more voltage phase signals; and a control circuit configured to:

obtain the one or more voltage phase signals;

determine respective DC components of the one or more voltage phase signals; and determine a phase error on the optical signal based on the respective AC components and the respective DC components of the one or more voltage phase signals.

* * * * *